US012327084B2

(12) United States Patent
Feng et al.

(10) Patent No.: US 12,327,084 B2
(45) Date of Patent: Jun. 10, 2025

(54) VIDEO QUESTION ANSWERING METHOD, ELECTRONIC DEVICE AND STORAGE MEDIUM

(71) Applicant: BEIJING BAIDU NETCOM SCIENCE TECHNOLOGY CO., LTD., Beijing (CN)

(72) Inventors: Bohao Feng, Beijing (CN); Yuxin Liu, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 373 days.

(21) Appl. No.: 17/954,767

(22) Filed: Sep. 28, 2022

(65) Prior Publication Data

US 2023/0121838 A1    Apr. 20, 2023

(30) Foreign Application Priority Data

Oct. 14, 2021   (CN) .......................... 202111196420.8

(51) Int. Cl.
*G06F 40/279*    (2020.01)
*G06F 40/30*    (2020.01)

(52) U.S. Cl.
CPC ............ *G06F 40/279* (2020.01); *G06F 40/30* (2020.01)

(58) Field of Classification Search
CPC ........ G06F 40/279; G06F 40/30; G06F 16/78; G06F 16/3329; G06N 3/044; G06N 3/08
See application file for complete search history.

(56) References Cited

U.S. PATENT DOCUMENTS

| 11,244,167 | B2 * | 2/2022 | Zhao .................... G06N 3/08 |
| 12,067,759 | B2 * | 8/2024 | Zhang ................ G06V 10/82 |
| 2018/0084023 | A1 * | 3/2018 | Stoop .................... H04L 67/02 |
| 2018/0144208 | A1 * | 5/2018 | Lu ........................ G06F 40/30 |

(Continued)

FOREIGN PATENT DOCUMENTS

| CN | 107463609 A | 12/2017 |
| CN | 107832724 A | 3/2018 |

(Continued)

OTHER PUBLICATIONS

Yao, Li, Atousa Torabi, Kyunghyun Cho, Nicolas Ballas, Christopher Pal, Hugo Larochelle, and Aaron Courville. "Describing videos by exploiting temporal structure." In Proceedings of the IEEE international conference on computer vision, pp. 4507-4515. 2015. (Year: 2015).*

M. Heilman and N. A. Smith, "Question generation via overgenerating transformations and ranking," Lang. Technol. Inst., School Comput. Sci., Carnegie Mellon Univ., Pittsburgh, PA, USA, Tech. Rep., 2009. (Year: 2009).*

(Continued)

*Primary Examiner* — Fariba Sirjani
(74) *Attorney, Agent, or Firm* — Brooks Kushman P.C.

(57) ABSTRACT

There is provided a video question answering method and apparatus, an electronic device and a storage medium, which relates to the field of artificial intelligence, such as natural language processing technologies, deep learning technologies, voice recognition technologies, knowledge graph technologies, computer vision technologies, or the like. The method includes: determining M key frames for a video corresponding to a to-be-answered question, M being a positive integer greater than 1 and less than or equal to a number of video frames in the video; and determining an answer corresponding to the question according to the M key frames.

12 Claims, 5 Drawing Sheets

(56) References Cited

U.S. PATENT DOCUMENTS

| | | | | |
|---|---|---|---|---|
| 2018/0285456 A1* | 10/2018 | Nichkawde | .............. | G06N 3/08 |
| 2019/0266409 A1 | 8/2019 | He et al. | | |
| 2020/0139973 A1* | 5/2020 | Palanisamy | ............ | G06N 3/084 |
| 2021/0012222 A1* | 1/2021 | Kim | ......................... | G06F 40/30 |
| 2021/0103615 A1* | 4/2021 | Jindal | ................ | G06F 16/7837 |
| 2021/0248375 A1* | 8/2021 | Geng | .................. | G06F 16/9035 |
| 2021/0248376 A1* | 8/2021 | Zhao | ...................... | G06V 20/49 |
| 2022/0230628 A1* | 7/2022 | Zhu | ......................... | G10L 15/063 |
| 2022/0350826 A1* | 11/2022 | Zhang | .................. | G06F 16/732 |
| 2023/0017614 A1* | 1/2023 | Srinivasa | ............... | G06V 20/42 |
| 2023/0027713 A1* | 1/2023 | Wu | ......................... | G06V 20/49 |
| 2023/0121838 A1* | 4/2023 | Feng | .................. | G06F 16/3329 |
| | | | | 704/9 |
| 2024/0037896 A1* | 2/2024 | Zhang | .................. | G06V 10/764 |
| 2025/0022458 A1* | 1/2025 | Audhkhasi | ............... | G06N 3/04 |

FOREIGN PATENT DOCUMENTS

| | | |
|---|---|---|
| CN | 109271506 A | 1/2019 |
| CN | 109508642 A | 3/2019 |
| CN | 109587581 A | 4/2019 |
| CN | 109784280 A | 5/2019 |
| CN | 109829049 A | 5/2019 |
| CN | 110072142 A | 7/2019 |
| CN | 110399457 A | 11/2019 |
| CN | 110781347 A | 2/2020 |
| CN | 111310655 A | 6/2020 |
| CN | 111368656 A | 7/2020 |
| CN | 112131364 A | 12/2020 |
| CN | 112288142 A | 1/2021 |
| CN | 113392288 A | 9/2021 |
| WO | 2021045434 A1 | 3/2021 |

OTHER PUBLICATIONS

Zhao, Zhou, Qifan Yang, Deng Cai, Xiaofei He, Yueting Zhuang, Zhou Zhao, Qifan Yang, Deng Cai, Xiaofei He, and Yueting Zhuang. "Video Question Answering via Hierarchical Spatio-Temporal Attention Networks." In IJCAI, vol. 2, p. 8. 2017. (Year: 2017).*

J. Li, X. Liu, W. Zhang, M. Zhang, J. Song and N. Sebe, "Spatio-Temporal Attention Networks for Action Recognition and Detection," in IEEE Transactions on Multimedia, vol. 22, No. 11, pp. 2990-3001, Nov. 2020, doi: 10.1109/TMM.2020.2965434. (Year: 2020).*

Zhang, et al., Frame Augmented Alternating Attention Network for Video Question Answering, IEEE Transactions on Multimedia, vol. X, No. X, X, X, 1-9, 2019.

Extended European Search Report of European patent application No. 22198021.2 dated Feb. 28, 2023, 8 pages.

Wang Weining et al., "Long video question answering: A Matching-guided Attention Model", Pattern Recognition, Elsevier, GB, vol. 102, Jan. 30, 2020 (Jan. 30, 2020), pp. 1-11, XP086066543, ISSN: 0031-3203, DOI: 10.1016/J.PATCOG.2020.107248 [retrieved on Jan. 30, 2020].

Zhou Zhao et al., "Video Question Answering via Hierarchical Spatio-Temporal Attention Networks", Proceedings of the Twenty-Sixth International Joint Conference on Artificial Intelligence, Aug. 2017 (Aug. 2017), pp. 3518-3524, XP055575917, California, US DOI: 10.24963/jcai.2017/492 ISBN: 978-0-9992411-0-3.

Yu Ting et al., "Long-Term Video Question Answering via Multimodal Hierarchical Memory Attentive Networks", IEEE Transactions on Circuits and Systems for Video Technology, vol. 31, No. 3, May 20, 2020 (May 20, 2020), pp. 931-944, XP011843012, IEEE, US ISSN: 1051-8215, DOI: 10.1109/TCSVT.2020.2995959 [retrieved on Mar. 4, 2021].

* cited by examiner

VIDEO QUESTION ANSWERING METHOD, ELECTRONIC DEVICE AND STORAGE MEDIUM

CROSS-REFERENCE TO RELATED APPLICATIONS

The present application claims the priority of Chinese Patent Application No. 202111196420.8, filed on Oct. 14, 2021, with the title of "VIDEO QUESTION ANSWERING METHOD AND APPARATUS, ELECTRONIC DEVICE AND STORAGE MEDIUM." The disclosure of the above application is incorporated herein by reference in its entirety.

FIELD OF THE DISCLOSURE

The present disclosure relates to the field of artificial intelligence technologies, and particularly relates to the fields of natural language processing technologies, deep learning technologies, voice recognition technologies, knowledge graph technologies, computer vision technologies, or the like, and particularly to a video question answering method, an electronic device and a storage medium.

BACKGROUND OF THE DISCLOSURE

A video question answering refers to generation of answers (answering) in a natural language form to given questions by understanding relevant video content. Video question answering is widely applied in many scenarios, such as multimedia information retrieval scenarios, intelligent assistant and business service scenarios, or the like.

However, the current question answering usually only supports question answering for content on a single static picture in a video, and referenced information is too one-sided; that is, available information is limited, resulting in poor accuracy of an obtained answer.

SUMMARY OF THE DISCLOSURE

The present disclosure provides a video question answering method, an electronic device and a storage medium.

According to one aspect of the present disclosure, there is provided a method for video question answering, including determining M key frames for a video corresponding to a to-be-answered question, M being a positive integer greater than 1 and less than or equal to a number of video frames in the video; and determining an answer corresponding to the question according to the M key frames.

According to one aspect of the present disclosure, there is provided an electronic device, including at least one processor; and a memory communicatively connected with the at least one processor; wherein the memory stores instructions executable by the at least one processor, and the instructions are executed by the at least one processor to enable the at least one processor to perform a method for video question answering, wherein the method includes determining M key frames for a video corresponding to a to-be-answered question, M being a positive integer greater than 1 and less than or equal to a number of video frames in the video; and determining an answer corresponding to the question according to the M key frames.

According to one aspect of the present disclosure, there is provided a non-transitory computer readable storage medium with computer instructions stored thereon, wherein the computer instructions are used for causing a method for video question answering, wherein the method includes determining M key frames for a video corresponding to a to-be-answered question, M being a positive integer greater than 1 and less than or equal to a number of video frames in the video; and determining an answer corresponding to the question according to the M key frames.

It should be understood that the statements in this section are not intended to identify key or critical features of the embodiments of the present disclosure, nor limit the scope of the present disclosure. Other features of the present disclosure will become apparent from the following description.

BRIEF DESCRIPTION OF DRAWINGS

The drawings are used for better understanding the present solution and do not constitute a limitation of the present disclosure. In the drawings.

DETAILED DESCRIPTION OF PREFERRED EMBODIMENTS

The following part will illustrate exemplary embodiments of the present disclosure with reference to the drawings, including various details of the embodiments of the present disclosure for a better understanding. The embodiments should be regarded only as exemplary ones. Therefore, those skilled in the art should appreciate that various changes or modifications can be made with respect to the embodiments described herein without departing from the scope and spirit of the present disclosure. Similarly, for clarity and conciseness, the descriptions of the known functions and structures are omitted in the descriptions below.

In addition, it should be understood that the term "and/or" only describes an association relationship between associated objects, and indicates that three relationships may exist. For example, A and/or B may indicate three cases: only A exists; both A and B exist; and only B exists. In addition, in this specification, the symbol "/" generally indicates that associated objects have a relationship of "or".

Figure 1:
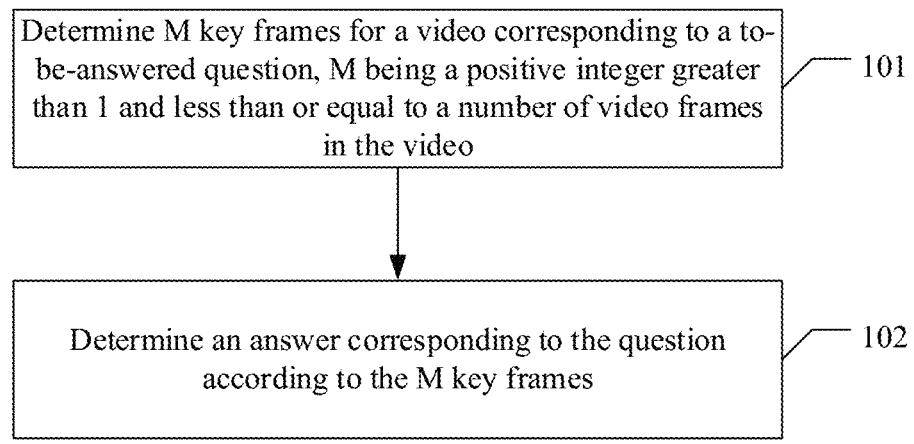
FIG. 1 is a flow chart of a method for video question answering according to a first embodiment of the present disclosure.

FIG. 1 is a flow chart of a method for video question answering according to a first embodiment of the present disclosure. As shown in FIG. 1, the method includes the following implementation steps of:

Step 101: determining M key frames for a video corresponding to a to-be-answered question, M being a positive integer greater than 1 and less than or equal to a number of video frames in the video; and Step 102: determining an answer corresponding to the question according to the M key frames.

It is observed that in the solution of the above method embodiment, the answer to the question may be generated in conjunction with the plural key frames determined from the video, such that more video information may be utilized, thereby improving accuracy of the acquired answer, or the like.

In one embodiment of the present disclosure, during determination of the M key frames from the video, description information of the video frames in the video may be acquired, and scores of correlation between the description information of the video frames and the question may be acquired, and then, the video frames may be sorted in a descending order of the scores of correlation, and the first M video frames after the sort are used as the key frames.

A specific value of M may be determined according to actual acquirements, and usually, the value of M may be less than the number of the video frames in the video, thereby reducing a workload of subsequent processing, and improving a processing efficiency, or the like.

A method of acquiring the description information of the video frames is not limited in the present disclosure. For example, the description information of the video frames may be generated using a neural compositional paradigm for image captioning (NCPIC) model.

By the NCPIC model, a generation process of the description information of the video frame (i.e., a picture) is divided into two parts of semantic analysis and syntactic analysis, and internal structure information of sentences is added into the syntactic analysis, such that the sentences better conform to a semantic rule.

For example, for any video frame, an object on the picture may be extracted with a target detection algorithm built in the NCPIC model firstly, and a simple phrase is formed; for example, two objects are extracted, the formed simple phrases may be names of the two objects respectively, such as "table" and "rose", and then, a sentence describing the objects in the picture may be generated using conjunctions in a corpus and object information in the picture, such as "there exists one rose on the table", and then, whether the generated sentence conforms to a grammatical rule may be judged, if yes, the sentence may be output directly, and if no, the conjunctions may be updated until a sentence conforming to the grammatical rule is output.

With the above method, the description information of each video frame may be acquired, and in practical applications, one video frame may correspond to one sentence or plural sentences as the description information thereof, depending on a specific implementation strategy of the NCPIC model.

Then, the scores of correlation between the description information of the video frames and the question may be acquired; for example, question answering prediction may be performed by a Chinese pre-trained language model (Roberta) to determine the scores of correlation between the description information of the video frames and the question.

After the scores of correlation of the video frames are obtained, the video frames may be sorted in the descending order of the scores of correlation, and the first M video frames after the sort are used as the key frames.

In one embodiment of the present disclosure, after the key frames are determined, vector representations of the key frames may also be acquired, and then, the answer corresponding to the question may be determined according to the vector representations of the key frames.

In one embodiment of the present disclosure, any key frame may be subjected to the following processing operations: extracting a target region of the key frame; extracting features of the key frame to obtain a feature vector corresponding to the key frame; extracting features of any extracted target region to obtain a feature vector corresponding to the target region, and generating a vector representation of the target region according to the feature vector corresponding to the target region; and generating the vector representation of the key frame according to the vector representation of each extracted target region and the feature vector corresponding to the key frame.

In the above processing way, the vector representation of the key frame may be generated in conjunction with feature information of the extracted target region and feature information of the key frame, such that information content included in the vector representation of the key frame is enriched, thereby improving the accuracy of the answer acquired subsequently.

For example, for each key frame, the target region may be extracted using an object detection model (M2Det), and in M2Det, a multi-level feature pyramid network structure is embedded into a single shot multibox detector (SSD) to form an end-to-end one-stage target detector, M2Det may be configured to detect targets of different scales, and a one-stage target detection algorithm is used, such that a speed thereof is higher than speeds of other algorithms.

One or more target regions may be extracted from any key frame, and in addition, the features of the key frame may be extracted to obtain the feature vector corresponding to the key frame, and the features of each extracted target region may be extracted to obtain the feature vector corresponding to each target region.

For example, the features of the key frame and the target region may be extracted using a convolutional neural network, which may be a deep residual network (Resnet), and the convolutional neural network is capable of solving the problems of gradient disappearance, explosion, network degradation, or the like, caused by an increase of a number of network layers.

The vector representation of any target region may be generated according to the feature vector corresponding to the target region, or the like. In one embodiment of the present disclosure, the feature vector corresponding to the target region and at least one of the following vectors may be spliced: a feature vector corresponding to the key frame where the target region is located, a text vector corresponding to the key frame where the target region is located, and an audio vector corresponding to the video; the vector representation of the target region may be acquired based on a splicing result; for example, the splicing result may be directly used as the vector representation of the target region; the text vector is obtained after text information extracted from the key frame where the target region is located is transformed to a vector, and the audio vector is obtained after text information corresponding to an audio of the video is transformed to a vector; in addition, a specific splicing sequence is not limited, and may be determined according to actual requirements.

Usually, some text information, such as subtitles, station names, magazine names, or the like, is included in the video frame, and is important information, the answer to the question may exist in the information, and therefore, a text detection and recognition algorithm may be invoked to recognize the text information in the video frame.

For example, the text information in the video frame may be recognized using a fast oriented text spotting (FOTS) algorithm, the FOTS algorithm is a fast end-to-end framework integrating detection and recognition, and compared with other text detection and recognition algorithms, the FOTS algorithm has advantages of a small model, a high speed, high precision, multi-angle support, or the like.

After the text information in the video frame is recognized, the acquired text information may be input into a bidirectional encoder representations from transformers (BERT) model, and the text information may be transformed to vector information using the BERT model, thereby obtaining the required text vector; usually, in the BERT model, a bidirectional Transformer is used to complete transformation of the text to the vector.

In addition, video question answering also involves voice transformation, and the voice transformation includes two steps: transforming the question to the corresponding text information, and then transforming the text information to a vector, so as to obtain the text vector; and transforming the audio of the video to the corresponding text information, and then transforming the text information to a vector, so as to obtain the audio vector.

Audio (voice) information may be transformed to the text information using a long short term memory-deep neural network (LSTM-DNN) model.

After the above processing, the obtained vector representation of the target region may incorporate plural kinds of information, such as the feature information of the target region, the feature information of the key frame where the target region is located, the text information, the audio information, or the like, thereby enriching the information content included in the vector representation of the target region, and laying a good foundation for subsequent processing.

In one embodiment of the present disclosure, a spatial attention weight corresponding to any target region may also be acquired, and the acquired spatial attention weight may be multiplied by the splicing result corresponding to the target region, and a multiplying result may be used as the vector representation of the target region.

The question in video question answering is often associated with plural targets at different spatial locations in the video frame, and usually, it is difficult to capture necessary visual information for answering the question only using global image features, and therefore, in the solution of the present disclosure, the target regions containing the targets with a high probability may be extracted from the video frame, and visual features may be extracted from the target regions; optionally, the spatial attention weights for the target regions may also be calculated by introducing a spatial attention mechanism, so as to distinguish a difference of importance of the target regions for question answering, and based on this mechanism, key information in the video frame may be positioned more precisely.

In one embodiment of the present disclosure, the spatial attention weight corresponding to any target region may be determined according to a question vector and the splicing result corresponding to the target region, and the question vector is obtained after text information corresponding to the question is transformed to a vector.

In one embodiment of the present disclosure, specifically, for any target region, a product of the question vector and a predetermined first weight parameter and a product of the splicing result and a predetermined second weight parameter may be acquired, the obtained two products and a predetermined first bias vector are added, a hyperbolic tangent neural network activation function operation is performed on an added sum, an operation result is multiplied by a predetermined third weight parameter, and the spatial attention weight corresponding to the target region is acquired based on the obtained product; for example, an obtained product may be normalized, and a processing result is used as the spatial attention weight corresponding to the target region.

That is, $$Q_{ji} = W \tanh(W_q x + W_f f_{ji} + b_s) \quad (1)$$

wherein tanh is a hyperbolic tangent neural network activation function, and has a range [−1,1], $W_q$ is the first weight parameter, $W_f$ is the second weight parameter, x represents the question vector, $f_{ji}$ represents the splicing result corresponding to any target region i in any key frame j, $b_s$ represents the first bias vector, W represents the third weight parameter, and specific values of the weight parameters may be determined according to actual conditions.

$Q_{ji}$ may be normalized after obtained by calculation, and the processing result may be used as the required spatial attention weight; for example, $Q_{ji}$ may be input into a regression (Softmax) function to obtain a normalized spatial attention weight $a_{ji}$.

Optionally, $a_{ji}$ may be multiplied by $f_{ji}$ and a multiplying result may be used as the vector representation of the target region i in the key frame j.

Optionally, the vector representation of any key frame may be generated according to the vector representations of the target regions extracted from the key frame and the feature vector corresponding to the key frame. In one embodiment of the present disclosure, the vector representations of the target regions and the feature vector corresponding to the key frame may be spliced, a splicing result is used as the vector representation of the key frame, and a specific splicing sequence may be determined according to actual requirements.

After the above processing, the vector representations of the key frames may be obtained. In one embodiment of the present disclosure, a timing attention weight corresponding to any key frame may also be acquired, the acquired timing attention weight may be multiplied by the vector representation of the key frame to obtain an updated vector representation of the key frame, and correspondingly, the answer corresponding to the question may be determined according to the updated vector representation of each key frame.

To acquire an ideal answer, information conveyed by video frames at plural different time points in the video is required to be understood comprehensively, and the information conveyed by the different video frames in the video may be learned by a timing attention mechanism; correspondingly, in the solution of the present disclosure, the timing attention mechanism is introduced into a video question answering task, which is of great significance for understanding complex temporal logic between the video frames and answering the question required to be analyzed across the video frames.

Figure 2:
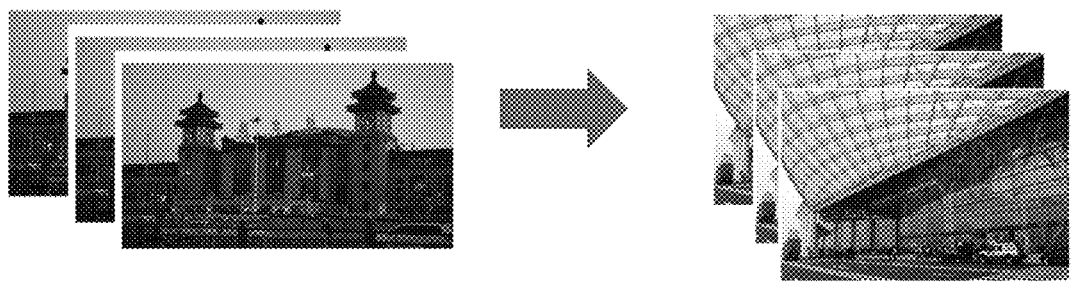
FIG. 2 is a schematic diagram of a timing attention mechanism in the present disclosure.

FIG. 2 is a schematic diagram of the timing attention mechanism in the present disclosure. As shown in FIG. 2, a left picture is Beijing station, a right picture is Guangzhou south station, and it is assumed that the video corresponding to the question is a video related to a tour introduction, a tour guide was in Beijing the day before, and is in Guangzhou on the day, and the question is "Where does the person in the video come from and where does the person go?", and usually, such a question is difficult to answer accurately without the timing attention mechanism; for example, the question may be answered incorrectly as "from Guangzhou to Beijing".

The vector representation updated after weighted in a time dimension may reflect different importance of different video frames to understand a timing relationship of the frames.

In the solution of the present disclosure, using a gated recurrent unit (GRU), the timing attention weight of each key frame may be calculated in conjunction with the vector representations of the two key frames before and after.

Correspondingly, in one embodiment of the present disclosure, the timing attention weight corresponding to any key frame may be determined according to the vector representation of the previous key frame and the vector representation of the key frame, and the previous key frame is located before the key frame and closest to the key frame in time.

In one embodiment of the present disclosure, specifically, for any key frame, a product of the vector representation of the previous key frame and a predetermined fourth weight parameter and a product of the vector representation of the key frame and a predetermined fifth weight parameter may be acquired, the obtained two products and a predetermined second bias vector are added, a hyperbolic tangent neural network activation function operation is performed on an added sum, an operation result is multiplied by a predetermined sixth weight parameter, and the timing attention weight corresponding to the key frame is acquired based on the obtained product; for example, an obtained product may be normalized, and a processing result is used as the timing attention weight corresponding to the key frame.

That is, $$T_{it} = W' \tanh(W_{t-1} h_{t-1} + W_t h_t + b'_s) \quad (2)$$

wherein tanh is a hyperbolic tangent neural network activation function, and has a range $[-1,1]$, $W_{t-1}$ is the fourth weight parameter, $W_t$ is the fifth weight parameter, $h_{t-1}$ represents the vector representation of the previous key frame of any key frame i, $h_t$ represents the vector representation of the key frame i, $b'_s$ represents the second bias vector, $W'$ represents the sixth weight parameter, and specific values of the weight parameters may be determined according to actual requirements.

$T_{jt}$ may be normalized after obtained by calculation, and the processing result may be used as the required timing attention weight; for example, $T_{jt}$ may be input into the Softmax function to obtain a normalized timing attention weight $t_j$.

Optionally, $t_j$ may be multiplied by $h_t$, and a multiplying result may be used as an updated vector representation of the key frame i.

After the above processing, the obtained vector representation of each key frame further includes timing features, such that the answer to the question acquired based on the vector representation of each key frame subsequently is more accurate.

In one embodiment of the present disclosure, if the question is an intuitive question, the corresponding answer may be determined using the vector representation of each key frame and the question, and if the question is a non-intuitive question, the corresponding answer may be determined using the vector representation of each key frame, the question and a corresponding knowledge graph.

The intuitive question is a question answered only using information in the video, i.e., a question which may be answered directly using the information in the video, for example, "what is the person in the video doing?", and correspondingly, the non-intuitive question refers to a question which may not be answered directly using the information in the video, for example, "what TV series does the female star in the video also star in?".

The answer to the non-intuitive question may be obtained by means of the knowledge graph. In one embodiment of the present disclosure, the knowledge graph may include one or all of: a generic knowledge graph and a special knowledge graph constructed from the video.

The generic knowledge graph refers to an existing knowledge graph of external knowledge, and the special knowledge graph refers to a knowledge graph corresponding to the video generated by analyzing the video. A common-sense question may be answered only by the generic knowledge graph, such as "who is the husband of the female star in the movie?", and a question required to be inferred based on information in the video is required to be answered by means of the special knowledge graph or the special knowledge graph and the generic knowledge graph, such as "who is the leading actor's girlfriend in the movie?".

A method of constructing the special knowledge graph is not limited. For example, the special knowledge graph may include various nodes, such as plot nodes, object nodes, attribute nodes, action nodes, time nodes, location nodes, or the like. The plot nodes refer to different plots in the video, the different plot nodes may be connected according to an occurrence sequence of the plots, and a relationship between every two plot nodes may be a time relationship or a logical relationship, or the like. The object nodes are objects appearing in the video frames, and may be acquired by a target detection model, and the object nodes may be connected with the corresponding plot nodes. The attribute nodes are used for describing an object, such as a person, types of the attribute nodes may include gender, appearance, expressions, or the like, attributes of the object may be acquired by an image classification model, and the attribute nodes may be connected with the corresponding object nodes. The action nodes represent actions or events occurring in the plots, and may be connected with the plot nodes, and actions of the objects may also be acquired by the image classification model. The time nodes and the location nodes may be connected with the plot nodes, represent time and locations of occurrence of the plots, and may be acquired by a video time axis and target detection.

A corresponding subgraph may be constructed for each video frame in the video, and then, all the subgraphs may be combined to obtain the complete knowledge graph corresponding to the video.

The special knowledge graph and the generic knowledge graph may be connected and expanded by the nodes; for example, a leading actor family graph in the movie belongs to the special knowledge graph, a player of the leading actor belongs to the generic knowledge graph, and the two knowledge graphs may be combined by the node of the leading actor.

Figure 3:
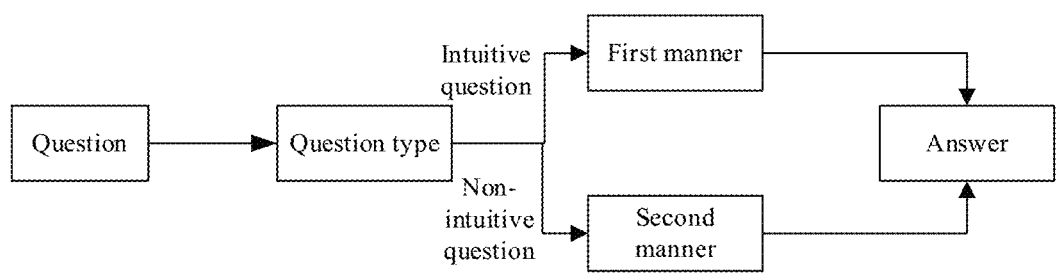
FIG. 3 is a schematic diagram of a manner of generating an answer to a question in the present disclosure.

Based on the above description, FIG. 3 is a schematic diagram of a manner of generating the answer to the question in the present disclosure. As shown in FIG. 3, for the to-be-answered question, a question type may be determined first, i.e., an intuitive question or a non-intuitive question, and a determination method is not limited; for example, the question type may be determined using a binary classification model, and if the question is an intuitive question, the answer to the question may be determined in a first manner; that is, the corresponding answer may be determined using the vector representation of each key frame and the question; for example, the vector representation of each key frame and the question vector may be input into a dynamic pointer network (DPN) model to obtain the output answer, a stepwise prediction manner is used in the DPN model, a word in each step is from a vocabulary table, a predicted word in the previous step is also input during decoding, a next word is predicted using a dynamic pointer network, and a complete sentence is output finally, i.e., the answer to the question; if the question is a non-intuitive question, the answer to the question may be determined in a second manner; that is, the corresponding answer may be determined using the vector representation of each key frame, the question, and the corresponding knowledge graph; for example, a relevant graph may be positioned according to the question and the vector representation of each key frame, and the answer to the question may be given using a knowledge base question answering (KGQA) model to analyze information contained in the question and the graph, or the like.

It is observed that in the solution of the present disclosure, for the to-be-answered question, different processing manners may be adopted according to different question types; that is, the answer to the question may be generated in the manner suitable for the type, thereby further improving the accuracy of the acquired answer; by introduction of the knowledge graph, the non-intuitive question may also be answered accurately; that is, various situations may be better processed, and the present disclosure has general applicability.

In addition, the question, the corresponding answer, or the like, may be stored and used for training relevant models, or the like, after marked manually.

Figure 4A:
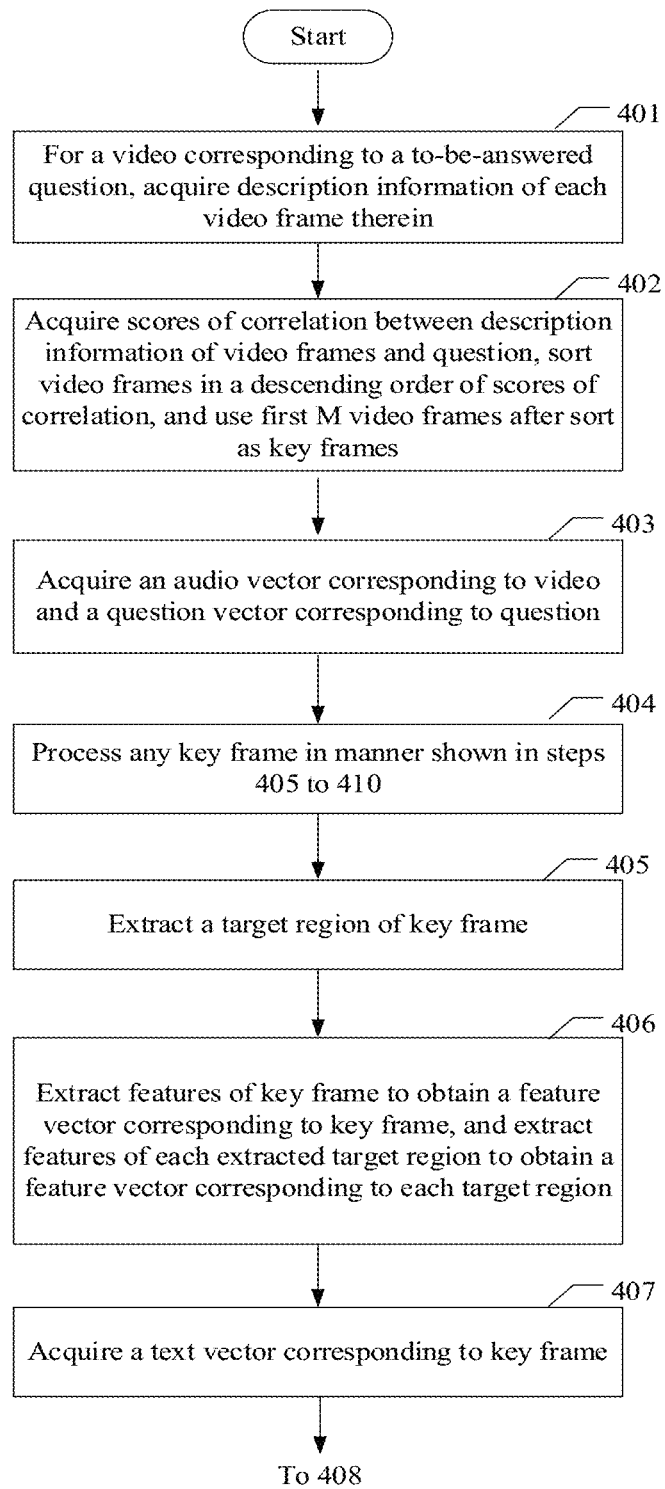
FIG. 4(a & b) is a flow chart of a method for video question answering according to a second embodiment of the present disclosure.
Figure 4B:
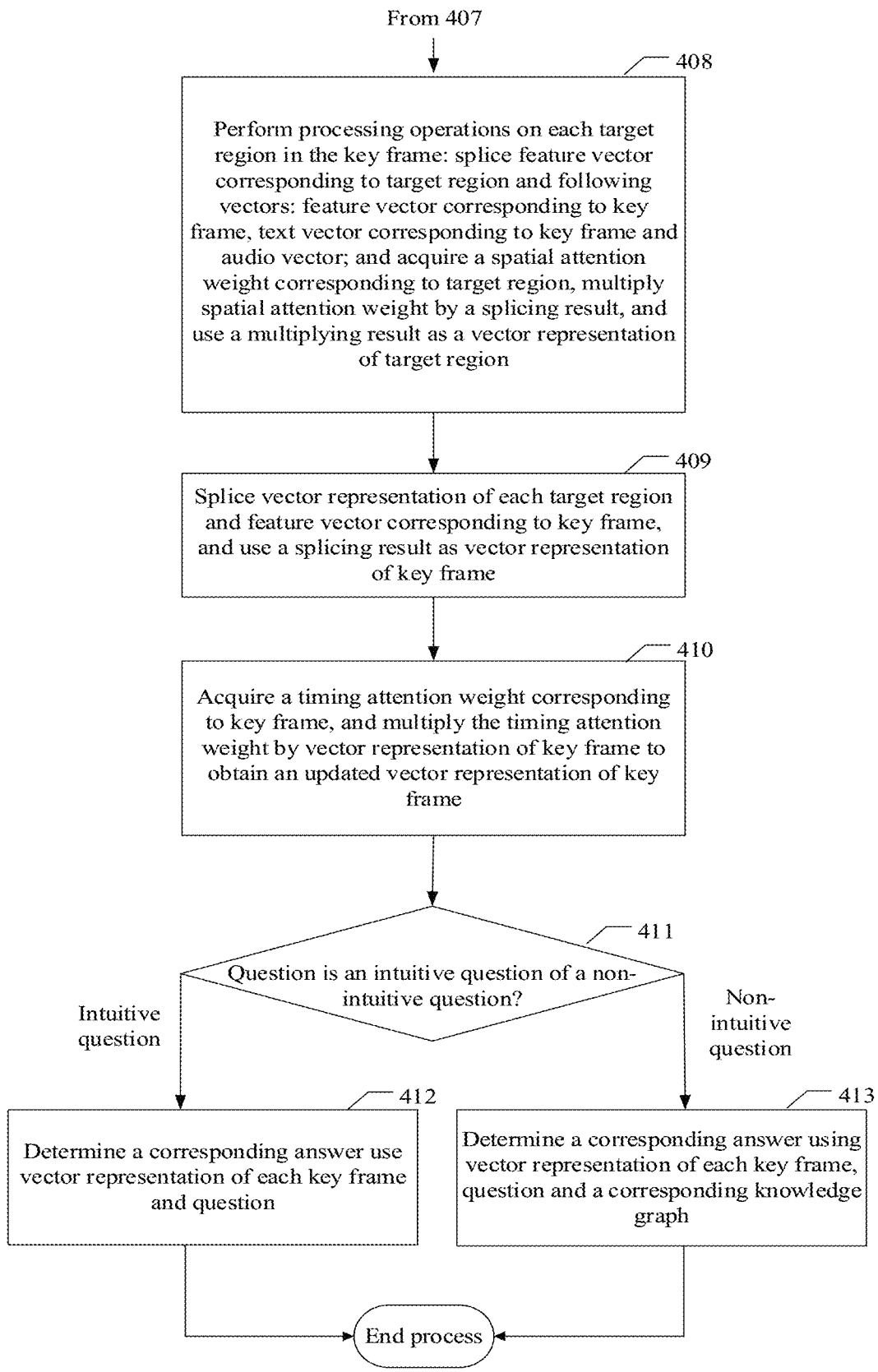

Based on the above description, FIG. 4 is a flow chart of a method for video question answering according to a second embodiment of the present disclosure. As shown in FIG. 4, the method includes the following implementation steps of:

Step 401: for a video corresponding to a to-be-answered question, acquiring description information of each video frame therein.

Step 402: acquiring scores of correlation between the description information of the video frames and the question, sorting the video frames in a descending order of the scores of correlation, and using the first M video frames after the sort as key frames.

Step 403: acquiring an audio vector corresponding to the video and a question vector corresponding to the question.

The audio vector may be obtained after text information corresponding to an audio of the video is transformed to a vector, and the question vector may be obtained after text information corresponding to the question is transformed to a vector.

Step 404: processing any key frame in the manner shown in Steps 405 to 410.

Step 405: extracting a target region of the key frame.

Step 406: extracting features of the key frame to obtain a feature vector corresponding to the key frame, and extracting features of each extracted target region to obtain a feature vector corresponding to each target region.

Step 407: acquiring a text vector corresponding to the key frame.

The text vector may be obtained after the text information extracted from the key frame is transformed to a vector.

Step 408: performing the following processing operations on each target region in the key frame: splicing the feature vector corresponding to the target region and the following vectors: the feature vector corresponding to the key frame, the text vector corresponding to the key frame and the audio vector; and acquiring a spatial attention weight corresponding to the target region, multiplying the spatial attention weight by a splicing result, and using a multiplying result as a vector representation of the target region.

For example, for any target region, a product of the question vector and a predetermined first weight parameter and a product of the splicing result and a predetermined second weight parameter may be acquired, the obtained two products and a predetermined first bias vector may be added, a hyperbolic tangent neural network activation function operation is performed on an added sum, an operation result may be then multiplied by a predetermined third weight parameter, an obtained product may be normalized, and a processing result is used as the spatial attention weight corresponding to the target region.

Step 409: splicing the vector representation of each target region and the feature vector corresponding to the key frame, and using a splicing result as the vector representation of the key frame.

Step 410: acquiring a timing attention weight corresponding to the key frame, and multiplying the timing attention weight by the vector representation of the key frame to obtain an updated vector representation of the key frame.

For example, a product of the vector representation of the previous key frame and a predetermined fourth weight parameter and a product of the vector representation of the key frame and a predetermined fifth weight parameter may be acquired, the obtained two products and a predetermined second bias vector may be added, a hyperbolic tangent neural network activation function operation is performed on an added sum, an operation result may be then multiplied by a predetermined sixth weight parameter, an obtained product may be normalized, and a processing result is used as the timing attention weight corresponding to the key frame.

Step 411: determining whether the question is an intuitive question of a non-intuitive question, if the question is an intuitive question, executing Step 412, and if the question is a non-intuitive question, executing Step 413.

Step 412: determining a corresponding answer using the vector representation of each key frame and the question, and ending the process.

Step 413: determining a corresponding answer using the vector representation of each key frame, the question and a corresponding knowledge graph, and ending the process.

It should be noted that for simplicity of description, all the above-mentioned embodiments of the method are described as combinations of a series of acts, but those skilled in the art should understand that the present disclosure is not limited by the described order of acts, as some steps may be performed in other orders or simultaneously according to the present disclosure. Further, those skilled in the art should also understand that the embodiments described in this specification are preferred embodiments and that acts and modules referred to are not necessary for the present disclosure. In addition, for parts that are not described in detail in a certain embodiment, reference may be made to the related descriptions of other embodiments.

The above is a description of an embodiment of the method, and an embodiment of an apparatus according to the present disclosure will be further described below.

Figure 5:
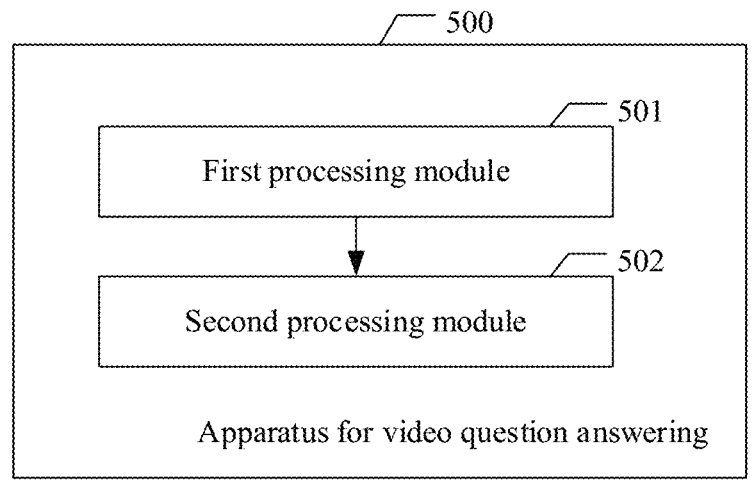
FIG. 5 is a schematic structural diagram of an apparatus for video question answering 500 according to an embodiment of the present disclosure.

FIG. 5 is a schematic structural diagram of an apparatus 500 for video question answering according to an embodiment of the present disclosure. As shown in FIG. 5, the thermal relief implementing apparatus includes:

a first processing module 501 configured to determine M key frames for a video corresponding to a to-be-answered question, M being a positive integer greater than 1 and less than or equal to a number of video frames in the video; and a second processing module 502 configured to determine an answer corresponding to the question according to the M key frames.

In the solution of the above apparatus embodiment, the answer to the question may be generated in conjunction with the plural key frames determined from the video, such that more video information may be utilized, thereby improving accuracy of the acquired answer, or the like.

In one embodiment of the present disclosure, the first processing module 501 may acquire description information of the video frames in the video, acquire scores of correlation between the description information of the video frames and the question, then sort the video frames in a descending order of the scores of correlation, and use the first M video frames after the sort as the key frames.

For example, the description information of each video frame may be generated using a NCPIC model, and the scores of correlation between the description information of the video frames and the question may be determined by Roberta.

In one embodiment of the present disclosure, the second processing module 502 may acquire vector representations of the key frames, and determine the answer corresponding to the question according to the vector representations of the key frames.

In one embodiment of the present disclosure, the second processing module 502 may perform the following processing operations on any key frame: extracting a target region of the key frame; extracting features of the key frame to obtain a feature vector corresponding to the key frame; extracting features of any extracted target region to obtain a feature vector corresponding to the target region, and generating a vector representation of the target region according to the feature vector corresponding to the target region; and generating the vector representation of the key frame according to the vector representation of each extracted target region and the feature vector corresponding to the key frame.

For example, the target region of each key frame may be extracted using M2Det, and in addition, the features of the key frame and the target region may be extracted using a convolutional neural network which may be Resnet.

The second processing module 502 may generate vector representation of any target region according to the feature vector corresponding to the target region, or the like. In one embodiment of the present disclosure, the second processing module 502 may splice the feature vector corresponding to the target region and at least one of the following vectors: a feature vector corresponding to the key frame where the target region is located, a text vector corresponding to the key frame where the target region is located, and an audio vector corresponding to the video; and acquire the vector representation of the target region based on a splicing result; the text vector is obtained after text information extracted from the key frame where the target region is located is transformed to a vector, and the audio vector is obtained after text information corresponding to an audio of the video is transformed to a vector.

For example, the text information in any key frame may be identified using a FOTS algorithm, the obtained text information may be input into a BERT model, and the text information is transformed into vector information using the BERT model, so as to obtain the required text vector.

In addition, video question answering also involves voice transformation, and the voice transformation includes two steps: transforming the question to the corresponding text information, and then transforming the text information to a vector, so as to obtain the text vector; and transforming the audio of the video to the corresponding text information, and then transforming the text information to a vector, so as to obtain the audio vector.

In one embodiment of the present disclosure, the second processing module 502 may acquire a spatial attention weight corresponding to any target region, multiply the acquired spatial attention weight by the splicing result corresponding to the target region, and use a multiplying result as the vector representation of the target region.

In one embodiment of the present disclosure, the second processing module 502 may determine the spatial attention weight corresponding to any target region according to a question vector and the splicing result corresponding to the target region, the question vector being obtained after text information corresponding to the question is transformed to a vector.

In one embodiment of the present disclosure, for any target region, the second processing module 502 may acquire a product of the question vector and a predetermined first weight parameter and a product of the splicing result and a predetermined second weight parameter, add the obtained two products and a predetermined first bias vector, perform a hyperbolic tangent neural network activation function operation on an added sum, multiply an operation result by a predetermined third weight parameter, and acquire the spatial attention weight corresponding to the target region based on the obtained product; for example, an obtained product may be normalized, and a processing result is used as the spatial attention weight corresponding to the target region.

The vector representation of any key frame may be generated according to the vector representations of the target regions extracted from the key frame and the feature vector corresponding to the key frame. In one embodiment of the present disclosure, the second processing module 502 may splice the vector representations of the target regions and the feature vector corresponding to the key frame, and use the splicing result as the vector representation of the key frame.

After the above processing, the vector representations of the key frames may be obtained. In one embodiment of the present disclosure, the second processing module 502 may further acquire a timing attention weight corresponding to any key frame, multiply the acquired timing attention weight by the vector representation of the key frame to obtain an updated vector representation of the key frame, and correspondingly determine the answer corresponding to the question according to the updated vector representation of each key frame.

In one embodiment of the present disclosure, the second processing module 502 may determine the timing attention weight corresponding to any key frame according to the vector representation of the previous key frame and the vector representation of the key frame, the previous key frame being located before the key frame and closest to the key frame in time.

In one embodiment of the present disclosure, for any key frame, the second processing module 502 may acquire a product of the vector representation of the previous key frame and a predetermined fourth weight parameter and a product of the vector representation of the key frame and a predetermined fifth weight parameter, add the obtained two products and a predetermined second bias vector, perform a hyperbolic tangent neural network activation function operation on an added sum, multiply an operation result by a predetermined sixth weight parameter, and acquire the timing attention weight corresponding to the key frame based on the obtained product; for example, an obtained product may be normalized, and a processing result is used as the timing attention weight corresponding to the key frame.

Optionally, the second processing module 502 may determine the answer corresponding to the question according to the vector representations of the key frames. In one embodiment of the present disclosure, if the question is an intuitive question, the corresponding answer may be determined using the vector representation of each key frame and the question, and the intuitive question is a question answered only using information in the video; if the question is a non-intuitive question, the corresponding answer may be determined using the vector representation of each key frame, the question and a corresponding knowledge graph.

The intuitive question refers to a question which may be answered directly using the information in the video, and correspondingly, the non-intuitive question refers to a question which may not be answered directly using the information in the video. The answer to the non-intuitive question may be obtained by means of the knowledge graph.

In one embodiment of the present disclosure, the knowledge graph may include one or all of: a generic knowledge graph and a special knowledge graph constructed from the video. The generic knowledge graph refers to an existing knowledge graph of external knowledge, and the special knowledge graph refers to a knowledge graph corresponding to the video generated by analyzing the video.

For example, for the intuitive question, the vector representation of each key frame and the question vector may be input into a DPN model to obtain the output answer, and for the non-intuitive question, the relevant graph may be positioned according to the question and the vector representation of each key frame, and the answer to the question may be given using a KGQA model to analyze information contained in the question and the graph, or the like.

For the specific work flow of the embodiment of the apparatus shown in FIG. 5, reference may be made to the related description in the foregoing embodiment of the method, and details are not repeated.

The solution of the present disclosure may be applied to the field of artificial intelligence, and particularly relates to the fields of natural language processing technologies, deep learning technologies, voice recognition technologies, knowledge graph technologies, computer vision technologies, or the like. Artificial intelligence is a subject of researching how to cause a computer to simulate certain thought processes and intelligent behaviors (for example, learning, inferring, thinking, planning, or the like) of a human, and includes both hardware-level technologies and software-level technologies. Generally, the hardware technologies of the artificial intelligence include technologies, such as a sensor, a dedicated artificial intelligence chip, cloud computing, distributed storage, big data processing, or the like; the software technologies of the artificial intelligence mainly include a computer vision technology, a voice recognition technology, a natural language processing technology, a machine learning/deep learning technology, a big data processing technology, a knowledge graph technology, or the like.

In addition, the video, the voice, or the like, in the embodiments of the present disclosure are not specific to a specific user, and cannot reflect personal information of a specific user. In the technical solution of the present disclosure, the collection, storage, usage, processing, transmission, provision, disclosure, or the like, of involved user personal information are in compliance with relevant laws and regulations, and do not violate public order and good customs.

According to the embodiment of the present disclosure, there are also provided an electronic device, a readable storage medium and a computer program product.

Figure 6:
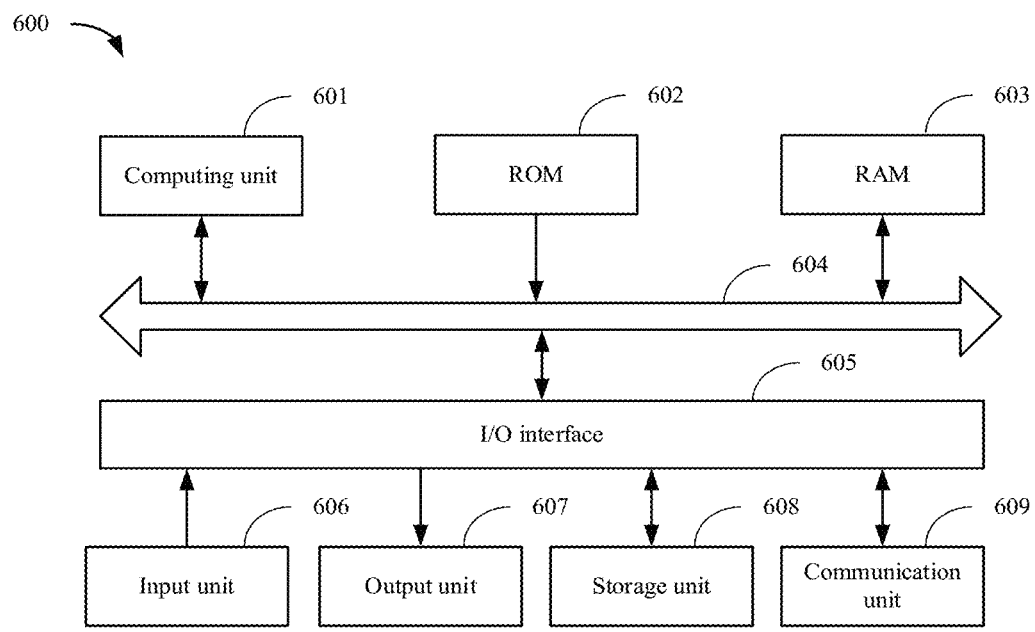
FIG. 6 shows a schematic block diagram of an electronic device 600 which may be configured to implement the embodiment of the present disclosure.

FIG. 6 shows a schematic block diagram of an electronic device 600 which may be configured to implement the embodiment of the present disclosure. The electronic device is intended to represent various forms of digital computers, such as laptop computers, desktop computers, workstations, servers, blade servers, mainframe computers, and other appropriate computers. The electronic device may also represent various forms of mobile apparatuses, such as personal digital assistants, cellular telephones, smart phones, wearable devices, and other similar computing apparatuses. The components shown herein, their connections and relationships, and their functions, are meant to be exemplary only, and are not meant to limit implementation of the present disclosure described and/or claimed herein.

As shown in FIG. 6, the device 600 includes a computing unit 601 which may perform various appropriate actions and processing operations according to a computer program stored in a read only memory (ROM) 602 or a computer program loaded from a storage unit 608 into a random access memory (RAM) 603. Various programs and data necessary for the operation of the device 600 may be also stored in the RAM 603. The computing unit 601, the ROM 602, and the RAM 603 are connected with one other through a bus 604. An input/output (I/O) interface 605 is also connected to the bus 604.

The plural components in the device 600 are connected to the I/O interface 605, and include: an input unit 606, such as a keyboard, a mouse, or the like; an output unit 607, such as various types of displays, speakers, or the like; the storage unit 608, such as a magnetic disk, an optical disk, or the like; and a communication unit 609, such as a network card, a modem, a wireless communication transceiver, or the like. The communication unit 609 allows the device 600 to exchange information/data with other devices through a computer network, such as the Internet, and/or various telecommunication networks.

The computing unit 601 may be a variety of general and/or special purpose processing components with processing and computing capabilities. Some examples of the computing unit 601 include, but are not limited to, a central processing unit (CPU), a graphic processing unit (GPU), various dedicated artificial intelligence (AI) computing chips, various computing units running machine learning model algorithms, a digital signal processor (DSP), and any suitable processor, controller, microcontroller, or the like. The computing unit 601 performs the methods and processing operations described above, such as the method according to the present disclosure. For example, in some embodiments, the method according to the present disclosure may be implemented as a computer software program tangibly contained in a machine readable medium, such as the storage unit 608. In some embodiments, part or all of the computer program may be loaded and/or installed into the device 600 via the ROM 602 and/or the communication unit 609. When the computer program is loaded into the RAM 603 and executed by the computing unit 601, one or more steps of the method according to the present disclosure may be performed. Alternatively, in other embodiments, the computing unit 601 may be configured to perform the method according to the present disclosure by any other suitable means (for example, by means of firmware).

Various implementations of the systems and technologies described herein above may be implemented in digital electronic circuitry, integrated circuitry, field programmable gate arrays (FPGA), application specific integrated circuits (ASIC), application specific standard products (ASSP), systems on chips (SOC), complex programmable logic devices (CPLD), computer hardware, firmware, software, and/or combinations thereof. The systems and technologies may be implemented in one or more computer programs which are executable and/or interpretable on a programmable system including at least one programmable processor, and the programmable processor may be special or general, and may receive data and instructions from, and transmit data and instructions to, a storage system, at least one input apparatus, and at least one output apparatus.

Program codes for implementing the method according to the present disclosure may be written in any combination of one or more programming languages. These program codes may be provided to a processor or a controller of a general purpose computer, a special purpose computer, or other programmable data processing apparatuses, such that the program code, when executed by the processor or the controller, causes functions/operations specified in the flowchart and/or the block diagram to be implemented. The program code may be executed entirely on a machine, partly on a machine, partly on a machine as a stand-alone software package and partly on a remote machine, or entirely on a remote machine or a server.

In the context of the present disclosure, the machine readable medium may be a tangible medium which may contain or store a program for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, a portable computer disk, a hard disk, a random access memory (RAM), a read only memory (ROM), an erasable programmable read only memory (EPROM or flash memory), an optical fiber, a portable compact disc read only memory (CD-ROM), an optical storage device, a magnetic storage device, or any suitable combination of the foregoing.

To provide interaction with a user, the systems and technologies described here may be implemented on a computer having: a display apparatus (for example, a cathode ray tube (CRT) or liquid crystal display (LCD) monitor) for displaying information to a user; and a keyboard and a pointing apparatus (for example, a mouse or a trackball) by which a user may provide input for the computer. Other kinds of apparatuses may also be used to provide interaction with a user; for example, feedback provided for a user may be any form of sensory feedback (for example, visual feedback, auditory feedback, or tactile feedback); and input from a user may be received in any form (including acoustic, speech or tactile input).

The systems and technologies described here may be implemented in a computing system (for example, as a data server) which includes a back-end component, or a computing system (for example, an application server) which includes a middleware component, or a computing system (for example, a user computer having a graphical user interface or a web browser through which a user may interact with an implementation of the systems and technologies described here) which includes a front-end component, or a computing system which includes any combination of such back-end, middleware, or front-end components. The components of the system may be interconnected through any form or medium of digital data communication (for example, a communication network). Examples of the communication network include: a local area network (LAN), a wide area network (WAN) and the Internet.

A computer system may include a client and a server. Generally, the client and the server are remote from each other and interact through the communication network. The relationship between the client and the server is generated by virtue of computer programs which run on respective computers and have a client-server relationship to each other. The server may be a cloud server or a server of a distributed system, or a server incorporating a blockchain.

It should be understood that various forms of the flows shown above may be used and reordered, and steps may be added or deleted. For example, the steps described in the present disclosure may be executed in parallel, sequentially, or in different orders, which is not limited herein as long as the desired results of the technical solution disclosed in the present disclosure may be achieved.

The above-mentioned implementations are not intended to limit the scope of the present disclosure. It should be understood by those skilled in the art that various modifications, combinations, sub-combinations and substitutions may be made, depending on design requirements and other factors. Any modification, equivalent substitution and improvement made within the spirit and principle of the present disclosure all should be included in the extent of protection of the present disclosure.

What is claimed is:

1. A computer-implemented method for video question answering, comprising:

determining M key frames for a video corresponding to a to-be-answered question, M being a positive integer greater than 1 and less than or equal to a number of video frames in the video, including: for any video frame in the video, extracting object information in the video frame respectively, and generating a sentence describing the objects in the video frame using conjunctions in a corpus and the object information; in response to the generated sentence conforming to a grammatical rule, outputting the generated sentence as description information of the video frame, and otherwise, updating the conjunctions until a sentence conforming to the grammatical rule is generated and outputting the generated sentence as description information of the video frame; acquiring scores of correlation between the description information of respective video frames and the question; and sorting the video frames in the descending order of the scores of correlation, and using the first M video frames after the sort as the key frames; and acquiring vector representations of the key frames; and determining the answer corresponding to the question according to the vector representations of the key frames, including: determining a question type of the question, if the question is an intuitive question, determining the corresponding answer using the vector representation of each key frame and the question, wherein the intuitive question is a question which can be answered directly using the information in the video; and if the question is a non-intuitive question, determining the corresponding answer using the vector representation of each key frame, the question and a corresponding knowledge graph, wherein the non-intuitive question is a question which may not be answered directly using the information in the video, and the knowledge graph comprises a generic knowledge graph and/or a special knowledge graph constructed from the video, the method further comprising:

for any key frame, acquiring a product of the vector representation of a previous key frame and a predetermined fourth weight parameter and a product of the vector representation of the key frame and a predetermined fifth weight parameter; adding the obtained two products and a predetermined second bias vector, and performing a hyperbolic tangent neural network activation function operation on the added sum; and multiplying an operation result by a predetermined sixth weight parameter, and acquiring the timing attention weight corresponding to the key frame based on the obtained product, the previous key frame being located before the key frame and closest to the key frame in time, wherein the determining the answer corresponding to the question according to the vector representations of the key frames comprises: determining the answer corresponding to the question according to the updated vector representations of the key frames.

2. The method according to claim 1, wherein the acquiring vector representations of the key frames comprises:

performing the following processing operations on any key frame:

extracting a target region of the key frame;

extracting features of the key frame to obtain a feature vector corresponding to the key frame;

extracting features of any extracted target region to obtain a feature vector corresponding to the target region, and generating a vector representation of the target region according to the feature vector corresponding to the target region; and generating the vector representation of the key frame according to the vector representation of each extracted target region and the feature vector corresponding to the key frame.

3. The method according to claim 2, wherein the generating a vector representation of the target region according to the feature vector corresponding to the target region comprises:

splicing the feature vector corresponding to the target region and at least one of the following vectors: a feature vector corresponding to the key frame where the target region is located, a text vector corresponding to the key frame where the target region is located, and an audio vector corresponding to the video; and acquiring the vector representation of the target region based on a splicing result;

the text vector is obtained after text information extracted from the key frame where the target region is located is transformed to a vector, and the audio vector is obtained after text information corresponding to an audio of the video is transformed to a vector.

4. The method according to claim 3, wherein the acquiring the vector representation of the target region based on a splicing result comprises:

acquiring a spatial attention weight corresponding to the target region, multiplying the spatial attention weight by the splicing result corresponding to the target region, and using a multiplying result as the vector representation of the target region.

5. The method according to claim 4, wherein the acquiring a spatial attention weight corresponding to the target region comprises:

determining the spatial attention weight corresponding to the target region according to a question vector and the splicing result corresponding to the target region, the question vector being obtained after text information corresponding to the question is transformed to a vector.

6. The method according to claim 5, wherein the determining the spatial attention weight corresponding to the target region according to a question vector and the splicing result corresponding to the target region comprises:

acquiring a product of the question vector and a predetermined first weight parameter and a product of the splicing result and a predetermined second weight parameter;

adding the obtained two products and a predetermined first bias vector, and performing a hyperbolic tangent neural network activation function operation on an added sum; and multiplying an operation result by a predetermined third weight parameter, and acquiring the spatial attention weight corresponding to the target region based on the obtained product.

7. The method according to claim 2, wherein the generating the vector representation of the key frame according to the vector representation of each extracted target region and the feature vector corresponding to the key frame comprises:

splicing the vector representation of each target region and the feature vector corresponding to the key frame, and using a splicing result as the vector representation of the key frame.

8. An electronic device, comprising:

at least one processor; and a memory communicatively connected with the at least one processor;

wherein the memory stores instructions executable by the at least one processor, and the instructions are executed by the at least one processor to enable the at least one processor to perform a method for video question answering, wherein the method comprises:

determining M key frames for a video corresponding to a to-be-answered question, M being a positive integer greater than 1 and less than or equal to a number of video frames in the video, including: for any video frame in the video, extracting object information in the video frame respectively, and generating a sentence describing the objects in the video frame using conjunctions in a corpus and the object information; in response to the generated sentence conforming to a grammatical rule, outputting the generated sentence as description information of the video frame, and otherwise, updating the conjunctions until a sentence conforming to the grammatical rule is generated and outputting the generated sentence as description information of the video frame; acquiring scores of correlation between the description information of respective video frames and the question; and sorting the video frames in the descending order of the scores of correlation, and using the first M video frames after the sort as the key frames; and acquiring vector representations of the key frames; and determining the answer corresponding to the question according to the vector representations of the key frames, including: determining a question type of the question, if the question is an intuitive question, determining the corresponding answer using the vector representation of each key frame and the question, wherein the intuitive question is a question which can be answered directly using the information in the video; and if the question is a non-intuitive question, determining the corresponding answer using the vector representation of each key frame, the question and a corresponding knowledge graph, wherein the non-intuitive question is a question which may not be answered directly using the information in the video, and the knowledge graph comprises a generic knowledge graph and/or a special knowledge graph constructed from the video, the method further comprising:
for any key frame, acquiring a product of the vector representation of a previous key frame and a predetermined fourth weight parameter and a product of the vector representation of the key frame and a predetermined fifth weight parameter; adding the obtained two products and a predetermined second bias vector, and performing a hyperbolic tangent neural network activation function operation on the added sum; and multiplying an operation result by a predetermined sixth weight parameter, and acquiring the timing attention weight corresponding to the key frame based on the obtained product, the previous key frame being located before the key frame and closest to the key frame in time, wherein the determining the answer corresponding to the question according to the vector representations of the key frames comprises: determining the answer corresponding to the question according to the updated vector representations of the key frames.

9. The electronic device according to claim 8,
wherein the acquiring vector representations of the key frames comprises: performing the following processing operations on any key frame: extracting a target region of the key frame; extracting features of the key frame to obtain a feature vector corresponding to the key frame; extracting features of any extracted target region to obtain a feature vector corresponding to the target region, and generating a vector representation of the target region according to the feature vector corresponding to the target region; and generating the vector representation of the key frame according to the vector representation of each extracted target region and the feature vector corresponding to the key frame.

10. The electronic device according to claim 9,
wherein the generating a vector representation of the target region according to the feature vector corresponding to the target region comprises: splicing the feature vector corresponding to the target region and at least one of the following vectors: a feature vector corresponding to the key frame where the target region is located, a text vector corresponding to the key frame where the target region is located, and an audio vector corresponding to the video; and acquire the vector representation of the target region based on a splicing result;

the text vector is obtained after text information extracted from the key frame where the target region is located is transformed to a vector, and the audio vector is obtained after text information corresponding to an audio of the video is transformed to a vector.

11. The electronic device according to claim 10,
wherein the acquiring the vector representation of the target region based on a splicing result comprises: acquiring a spatial attention weight corresponding to the target region, multiplying the spatial attention weight by the splicing result corresponding to the target region, and using a multiplying result as the vector representation of the target region.

12. A non-transitory computer readable storage medium with computer instructions stored thereon, wherein the computer instructions are used for causing a method for video question answering, wherein the method comprises:
determining M key frames for a video corresponding to a to-be-answered question, M being a positive integer greater than 1 and less than or equal to a number of video frames in the video, including: for any video frame in the video, extracting object information in the video frame respectively, and generating a sentence describing the objects in the video frame using conjunctions in a corpus and the object information; in response to the generated sentence conforming to a grammatical rule, outputting the generated sentence as description information of the video frame, and otherwise, updating the conjunctions until a sentence conforming to the grammatical rule is generated and outputting the generated sentence as description information of the video frame; acquiring scores of correlation between the description information of respective video frames and the question; and sorting the video frames in the descending order of the scores of correlation, and using the first M video frames after the sort as the key frames; and acquiring vector representations of the key frames; and determining the answer corresponding to the question according to the vector representations of the key frames, including: determining a question type of the question, if the question is an intuitive question, determining the corresponding answer using the vector representation of each key frame and the question, wherein the intuitive question is a question which can be answered directly using the information in the video; and if the question is a non-intuitive question, determining the corresponding answer using the vector representation of each key frame, the question and a corresponding knowledge graph, wherein the non-intuitive question is a question which may not be answered directly using the information in the video, and the knowledge graph comprises a generic knowledge graph and/or a special knowledge graph constructed from the video, the method further comprising:
for any key frame, acquiring a product of the vector representation of a previous key frame and a predetermined fourth weight parameter and a product of the vector representation of the key frame and a predetermined fifth weight parameter; adding the obtained two products and a predetermined second bias vector, and performing a hyperbolic tangent neural network activation function operation on the added sum; and multiplying an operation result by a predetermined sixth weight parameter, and acquiring the timing attention weight corresponding to the key frame based on the obtained product, the previous key frame being located before the key frame and closest to the key frame in time, wherein the determining the answer corresponding to the question according to the vector representations of the key frames comprises: determining the answer corresponding to the question according to the updated vector representations of the key frames.

\* \* \* \* \*